US011834046B2

(12) United States Patent
Komoguchi et al.

(10) Patent No.: US 11,834,046 B2
(45) Date of Patent: Dec. 5, 2023

(54) VEHICLE CONTROL APPARATUS

(71) Applicant: DENSO CORPORATION, Kariya (JP)

(72) Inventors: Yuta Komoguchi, Kariya (JP); Yohei Masui, Kariya (JP); Mitsuhiro Tokimasa, Kariya (JP); Takumi Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 448 days.

(21) Appl. No.: 17/103,791

(22) Filed: Nov. 24, 2020

(65) Prior Publication Data

US 2021/0094548 A1    Apr. 1, 2021

Related U.S. Application Data

(63) Continuation of application No. PCT/JP2019/020045, filed on May 21, 2019.

(30) Foreign Application Priority Data

May 25, 2018  (JP) ................................. 2018-100546

(51) Int. Cl.
*B60W 30/18* (2012.01)
(52) U.S. Cl.
CPC ............... *B60W 30/18159* (2020.02); *B60W 30/18154* (2013.01); *B60W 2552/53* (2020.02); *B60W 2555/60* (2020.02)
(58) Field of Classification Search
CPC ......... B60W 30/181; B60W 30/18154; B60W 30/18159
See application file for complete search history.

(56) References Cited

U.S. PATENT DOCUMENTS

| | | | |
|---|---|---|---|
| 2017/0236413 A1 | 8/2017 | Takagi | |
| 2017/0341643 A1* | 11/2017 | Gutmann | G08G 1/09623 |
| 2018/0074502 A1* | 3/2018 | Holben | B60W 30/18154 |
| 2018/0141547 A1* | 5/2018 | Fujiki | B60W 30/10 |
| 2019/0009782 A1* | 1/2019 | Kanzawa | B60W 30/10 |
| 2019/0031174 A1* | 1/2019 | Adachi | B60W 30/181 |
| 2020/0026284 A1* | 1/2020 | Hiramatsu | G01C 21/36 |
| 2020/0361488 A1* | 11/2020 | Miura | B60W 40/04 |

FOREIGN PATENT DOCUMENTS

| | | |
|---|---|---|
| JP | 2016-15168 A | 1/2016 |
| JP | 2018-18389 A | 2/2018 |

\* cited by examiner

*Primary Examiner* — Anshul Sood
(74) *Attorney, Agent, or Firm* — MASCHOFF BRENNAN

(57) ABSTRACT

A vehicle control apparatus includes an intersection information detection section that detects information on an intersection, and includes a traveling route detection section that detects a traveling route of the vehicle and a cross road detection section that detects a cross road intersecting the traveling route, an operation detection section that detects a plan of operation of the vehicle at the intersection, a waiting position setting section that sets a waiting position where the vehicle is caused to wait at the intersection until the vehicle becomes possible to perform the operation, and a determination section that determines whether the vehicle can perform the operation by the time a traffic light on the traveling route at the intersection turns red. The waiting position setting section sets a position, where another vehicle is not hindered from traveling on the crossing road by the vehicle stopped at the waiting position, as the waiting position.

5 Claims, 11 Drawing Sheets

COMPARATIVE EXAMPLE

SECOND EMBODIMENT

ANOTHER EMBODIMENT 1

ANOTHER EMBODIMENT 2

VEHICLE CONTROL APPARATUS

CROSS-REFERENCE TO RELATED APPLICATION

The present application is based on and claims the benefit of priority from earlier Japanese Patent Application No. 2018-100546 filed May 25, 2018, the description of which is incorporated herein by reference.

BACKGROUND

Technical Field

The present disclosure relates to a vehicle control apparatus that controls a vehicle.

Related Art

Vehicle control apparatuses are known which control an own vehicle when the own vehicle turns right or left at an intersection.

SUMMARY

As an aspect of the present disclosure, a vehicle control apparatus is provided.

The vehicle control apparatus vehicle control apparatus is installed in an own vehicle and controls the own vehicle. The apparatus includes:
- an intersection information detection section that detects information on an intersection through which the own vehicle travels, and includes a traveling route detection section that detects a traveling route of the own vehicle and a cross road detection section that detects a cross road intersecting the traveling route;
- an operation detection section that detects a plan of operation including movement of the own vehicle at the intersection;
- a waiting position setting section that sets a waiting position where the own vehicle is caused to wait at the intersection until the own vehicle becomes possible to perform the operation;
- a determination section that determines whether the own vehicle is able to perform the operation by the time when a traffic light on the traveling route at the intersection turns red, wherein
the intersection information detection section includes a stop line detection section that detects a stop line that is on the traveling route and is located at an overlapping region between the traveling route and the crossing road,
the waiting position setting section sets a position, where another vehicle is not hindered from traveling on the crossing road by the own vehicle stopped at the waiting position, as the waiting position,
the waiting position setting section sets a position in the traveling route and before an overlapped position between the detected traveling route and crossing road as the waiting position,
if the determination section determines that the own vehicle is not able to perform the operation, the waiting position setting section sets the waiting position, and
if the determination section determines that the own vehicle is able to perform the operation, the waiting position setting section sets the detected stop line as the waiting position.

DETAILED DESCRIPTION OF THE PREFERRED EMBODIMENTS

Figure 1:
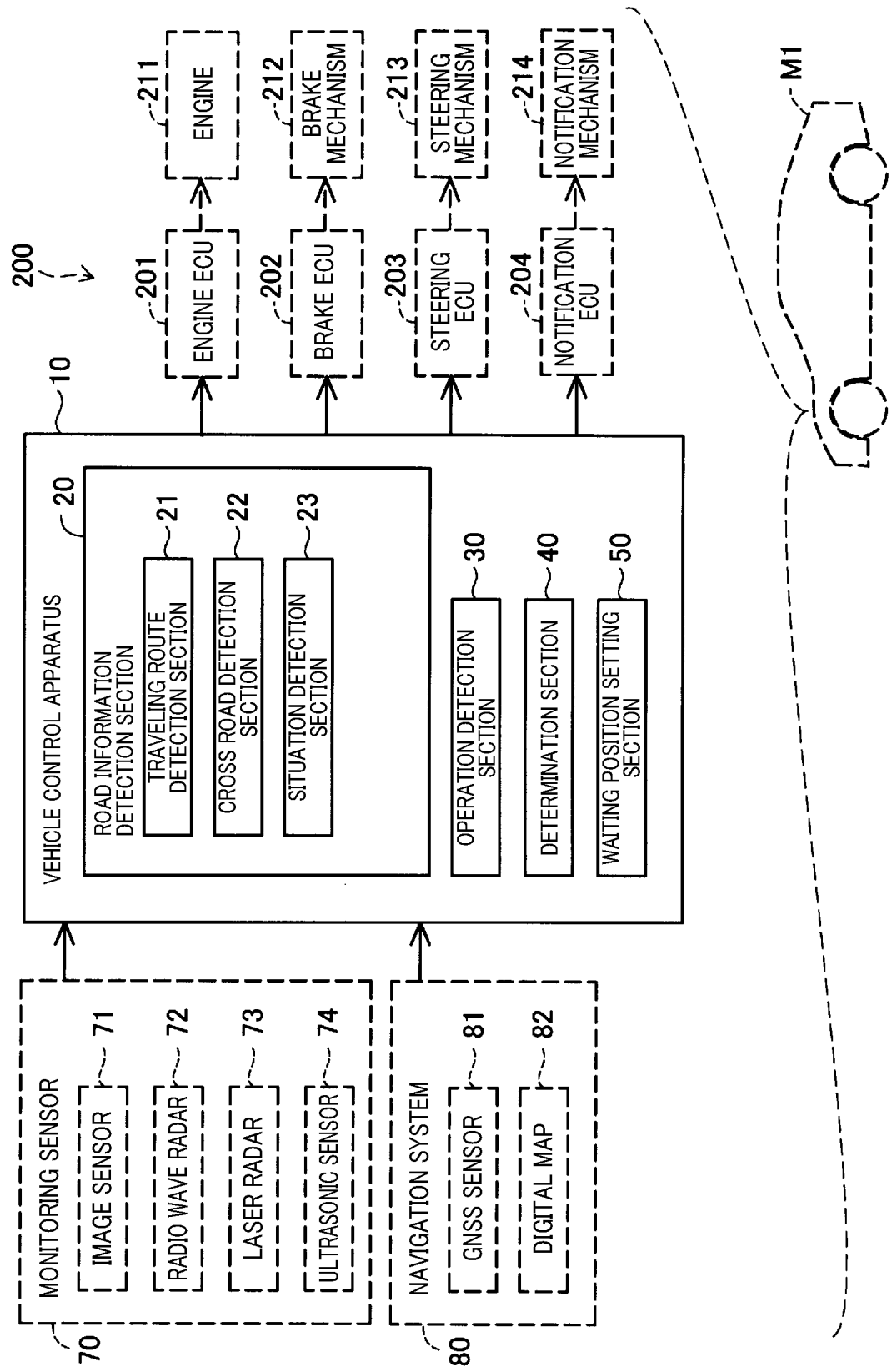
FIG. 1 is a block diagram illustrating a schematic configuration of a vehicle control apparatus.

Vehicle control apparatuses are known which control an own vehicle when the own vehicle turns right or left at an intersection. International publication No. 2016/027351 discloses a technique for causing an own vehicle, for example, when the own vehicle is waiting to turn right at an intersection of left-hand traffic roads, to wait at a position where a blind spot due to a right-turning vehicle in an on-coming lane can be decreased.

International publication No. 2016/027351 does not consider a case in which the own vehicle cannot turn right before the traffic light changes to red, due to a traffic jam or the like in a road which the own vehicle enters. Hence, when the traffic light changes to red while the own vehicle waits to turn right in the intersection, the own vehicle may hinder vehicles in the intersected road where the traffic light is green from traveling. This is a common problem not only in a case where the own vehicle turns right, but also in a case where the own vehicle travels straight or makes a U-turn, that is, in a case where the own vehicle moves at an intersection. Hence, techniques for preventing a vehicle from being hindered from traveling in crossing roads are required.

A. First Embodiment

A-1. Configuration of Apparatus

A vehicle control apparatus 10 according to the first embodiment of the present disclosure is installed in a vehicle and controls the vehicle traveling through intersections. The vehicle control apparatus 10 may control the vehicle not only when the vehicle travels through intersections but also in any traveling states. In the present embodiment, the vehicle in which the vehicle control apparatus 10 is installed is also referred to as an own vehicle. In the present embodiment, the own vehicle includes an engine. The own vehicle can perform automatic driving. Automatic driving refers to driving automatically performing engine control, brake control, and steering control instead of a driver. The own vehicle may be configured so as to be able to switch between automatic driving and manual driving. Manual driving refers to driving in which the driver performs operation for engine control (stepping on an accelerator), operation for brake control (stepping on a brake pedal), and operation for steering control (rotating a steering wheel).

The vehicle control apparatus 10 of the present embodiment is configured by an ECU (electronic control unit) in which a microcomputer and memories are incorporated. The vehicle control apparatus 10 is electrically connected to a monitoring sensor 70 and a navigation system 80 and instructs an operation control apparatus 200 on control.

The monitoring sensor 70 is configured by a sensor that detects objects present in surroundings of the own vehicle. The surroundings of the own vehicle include areas in front of, lateral to, and behind the own vehicle. The monitoring sensor 70 has an image sensor 71, a radio wave radar 72, a laser radar 73, and an ultrasonic sensor 74. The image sensor 71 is configured by an imaging camera and obtains at least captured images of an area in front of the own vehicle. The radio wave radar 72 detects reflected waves of emitted radio waves to determine whether there is an object in surroundings of the own vehicle, a distance between the object and the own vehicle, a location of the object, a size of the object, a shape of the object, and a relative speed of the object with respect to the own vehicle. The laser radar 73 determines whether there is an object in surroundings of the own vehicle, and the like, by using a laser beam of infrared rays. The ultrasonic sensor 74 determines a distance between the own vehicle and the object present in surroundings of the own vehicle, and the like, by using ultrasonic waves.

The navigation system 80 provides information on roads on which the own vehicle travels. The navigation system 80 has a GNSS sensor 81 and a digital map 82. The GNSS sensor 81 is configured by, for example, a GPS (global positioning system) sensor, and detects a current location of the own vehicle based on radio waves received from artificial satellites configuring a GPS. The digital map 82 is configured by a dynamic map. The dynamic map has, in addition to static map information such as road widths and lanes, dynamic information such as traffic jam.

The operation control apparatus 200 is a function section that controls operation of the own vehicle. In the present embodiment, the operation control apparatus 200 includes an engine ECU 201, a brake ECU 202, a steering ECU 203, and a notification ECU 204. The engine ECU 201 controls operation of an engine 211. Specifically, the engine ECU 201 controls various actuators, which are not shown, to control opening-closing operation of a throttle valve, ignition operation of an igniter, opening-closing operation of an intake valve, and the like. The brake ECU 202 controls a brake mechanism 212. The brake mechanism 212 is configured by devices (actuators) concerning brake control such as a sensor, a motor, a valve, a pump, and the like. The brake ECU 202 determines timing of applying the brakes and the amount of braking and controls the devices configuring the brake mechanism 212 so that the determined amount of braking is obtained at the determined timing. The steering ECU 203 controls a steering mechanism 213. The steering mechanism 213 is configured by devices (actuators) concerning steering such as a power steering motor. The steering ECU 203 determines the amount of steering (steering angle) based on measurement values obtained from a yaw rate sensor or a steering angle sensor, which are not shown, and controls the devices configuring the steering mechanism 213 so that the determined amount of steering is obtained. The notification ECU 204 controls a notification mechanism 214. The notification mechanism 214 is configured by a display device displaying characters, images, and the like, a loudspeaker outputting a sound, a warning tone, or the like to notify a driver of various pieces of information with visual information or auditory information. The notification ECU 204 determines contents of notification and the timing at which the notification is made and causes the notification mechanism 214 to display or output the notification.

The vehicle control apparatus 10 includes a road information detection section 20, an operation detection section 30, a determination section 40, and a waiting position setting section 50. These function sections 20 to 60 are implemented by a microcomputer, which is not shown, of the vehicle control apparatus 10, the microcomputer executing a control program previously stored in a storage section, which is not shown, of the vehicle control apparatus 10. Hereinafter, a case where vehicles follow the traffic regulations under which the vehicles run on left-side lanes will be described.

The road information detection section 20 detects information on a road on which the own vehicle travels, based on a detection result of the monitoring sensor 70 and information from the navigation system 80. The information on a road includes information on a road structure, information on a planned travel route based on destination information previously set in the own vehicle, and information on objects present in surroundings of the own vehicle. In addition, the road information detection section 20 determines whether the own vehicle is planned to travel through an intersection and detects information on the intersection through which the own vehicle is planned to travel. The intersection refers to an area including a meeting portion of two or more roads and the surroundings of the meeting portion. Whether the own vehicle is planned to travel through an intersection is determined based on, for example, information on a current location of the own vehicle detected by the GNSS sensor 81 and information of the digital map 82. The information on an intersection includes a road structure at the intersection, signal information, information on oncoming vehicles planned to travel through the intersection, and locations of other vehicles present in the intersection. The information on an intersection may be detected from at least one of detection results and information of the image sensor 71, the radio wave radar 72, the laser radar 73, the ultrasonic sensor 74, and the digital map 82.

The road information detection section 20 has a traveling route detection section 21, a cross road detection section 22, and a situation detection section 23. The traveling route detection section 21 detects a traveling route of the own vehicle at the intersection. The traveling route is specified on the digital map 82 based on information on a current location of the own vehicle detected by the GNSS sensor 81. The traveling route may be detected from at least one of detection results and information from the image sensor 71, the radio wave radar 72, the laser radar 73, the ultrasonic sensor 74, and the digital map 82, or may be detected based on previously set destination information.

The traveling route refers to a route connecting a lane in which the own vehicle travels before passing through the intersection and a lane in which the own vehicle is planned to travel after passing through the intersection. For example, when the own vehicle crosses an oncoming lane to turn right at the intersection, a route connecting a lane at the current location of the own vehicle and a lane which the own vehicle reaches after turning right is detected as a traveling route. Similarly, when the own vehicle travels in a straight line, a route connecting a lane at the current location of the own vehicle and a lane which the own vehicle reaches after traveling in a straight line is detected as a traveling route. When the own vehicle turns left, a route connecting a lane at the current location of the own vehicle and a lane which the own vehicle reaches after turning left is detected as a traveling route.

The cross road detection section 22 detects a crossing road intersecting a traveling route of the own vehicle at the intersection. The crossing road is specified on the digital map 82 based on information on a current location of the own vehicle detected by the GNSS sensor 81. The crossing road may be detected from at least one of detection results and information of the image sensor 71, the radio wave radar 72, the laser radar 73, the ultrasonic sensor 74, and the digital map 82.

Figure 2:
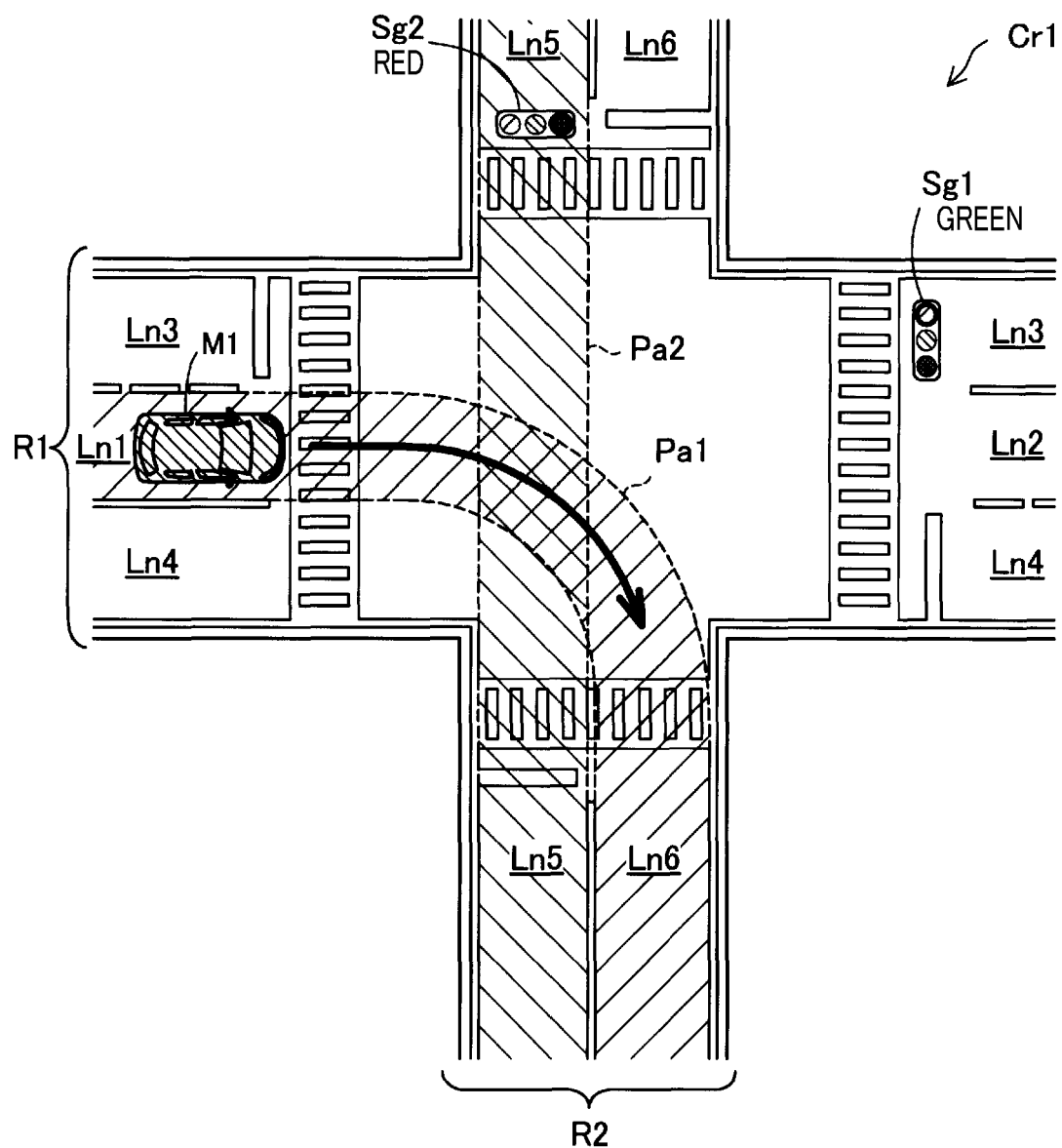
FIG. 2 is an explanatory diagram for describing a traveling route and crossing roads.

FIG. 2 illustrates an example of a case in which, at an intersection Cr1 at which two roads R1 and R2 intersect, an own vehicle M1 that is traveling on a road R1 is planned to turn right. In FIG. 2, the road R1 includes a lane Ln1, a lane Ln2, a lane Ln3, and a lane Ln4. The road R2 includes a lane Ln5 and a lane Ln6. The lane Ln1 is a right-turn-only lane in which the own vehicle M1 is traveling. The lane Ln2 is a right-turn-only lane of the oncoming lane. The lane Ln3 is parallel to the lane Ln1 and is a straight path. The lane Ln4 is a straight path of the oncoming lane. The road R2 is orthogonal to the road R1. A lane Ln5 is a straight path near to the current location of the own vehicle M1. A lane Ln6 is an oncoming lane of the lane Ln5 and is a straight path further from the current location of the own vehicle M1. Vehicles that travel in the lane Ln5 and the lane Ln6 may not only travel in a straight line through the intersection but also turn right or left at the intersection.

In FIG. 2, as a traveling route Pa1, a route connecting the lane Ln1 and the lane Ln6 which the own vehicle reaches after turning right is detected. As a crossing road Pa2, the lane Ln5 of the road R2 intersecting the road R1, which is nearer to the current location of the own vehicle M1, is detected. Instead of the lane Ln5, the whole road R2 may be detected as the crossing road Pa2. In the present embodiment, the crossing road Pa2 is detected as an area between left and right white lines corresponding to boundaries in the width direction of the lane Ln5. The crossing road Pa2 may be detected as an area between boundaries formed in any manner, such as not only white lines but also lines which are yellow or another color, and belt-shaped projections on the road. For example, the crossing road Pa2 may be detected as an area between a step of an edge of a sidewalk and a white line or an area between a step of an edge of a sidewalk and a median strip so as to include a road shoulder.

A situation detection section 23 shown in FIG. 1 detects a road situation of a place to which the own vehicle M1 moves according to a plan of operation including movement of the own vehicle M1 at the intersection Cr detected by the operation detection section 30 described later. The road situation includes, for example, a traffic jam situation of a road, a situation regarding presence or absence of obstacles, and a situation of a pedestrian crossing such as presence or absence of pedestrians. The road situation of a place to which the own vehicle M1 moves is detected based on a detection result of the monitoring sensor 70 and information from the navigation system 80. The road situation of a place to which the own vehicle M1 moves may be detected from at least one of detection results and information of the image sensor 71, the radio wave radar 72, the laser radar 73, the ultrasonic sensor 74, and the digital map 82.

The operation detection section 30 detects a plan of operation including movement of the own vehicle M1 at the intersection Cr. The plan of operation includes plans to turn right, travel in a straight line, turn left, and turn round (U-turn). In the present embodiment, the plan of operation is detected based on a current location of the own vehicle M1 detected by the GNSS sensor 81 and destination information previously set in the own vehicle M1. The plan of operation may be detected based on, for example, an operation result of a direction indictor.

The determination section 40 determines whether the own vehicle M1 can perform the planned operation by the time when a traffic light Sg1 on the traveling route Pa1 of the own vehicle M1 at the intersection Cr changes to red. Whether the planned operation can be performed is determined by using a road situation of a place to which the own vehicle M1 moves detected by the situation detection 23. This determination will be described in detail later. The red signal refers to a signal indicating a stop. The traffic light Sg1 on the traveling route Pa1 refers to a traffic light that is at the intersection Cr and is for the lane Ln1 in which the own vehicle M1 travels before passing through the intersection Cr. The time by which the traffic light Sg1 on the traveling route Pa1 of the own vehicle M1 at the intersection Cr changes to red is not limited to the time by which the traffic light Sg1 changes from green indicating permission to pass to red, but includes the time by which the traffic light Sg1 changes from an arrow indicating permission to pass in a specified direction to red.

The waiting position setting section 50 sets a waiting position at which the own vehicle M1 waits at the intersection Cr until the own vehicle M1 becomes possible to perform the planned operation. More specifically, a position is set as a waiting position where another vehicle M2 is not hindered from traveling on the crossing road Pa2 by the own vehicle M1 remaining stopped at the waiting position while the own vehicle M1 cannot perform the planned operation until the traffic light Sg1 on the traveling route Pa1 at the intersection Cr turns red. In the present embodiment, a position in the traveling route Pa1 and before an overlapped position between the traveling route Pa1 and the crossing road Pa2 is set as a waiting position. Setting of the overlapped position and the waiting position will be described later in detail.

In the present embodiment, the road information detection section 20 corresponds to a subordinate concept of an intersection information detection section of the present disclosure, and the operation control apparatus 200 corresponds to a subordinate concept of a guidance section of the present disclosure.

A-2. Vehicle Control Process

Figure 3:
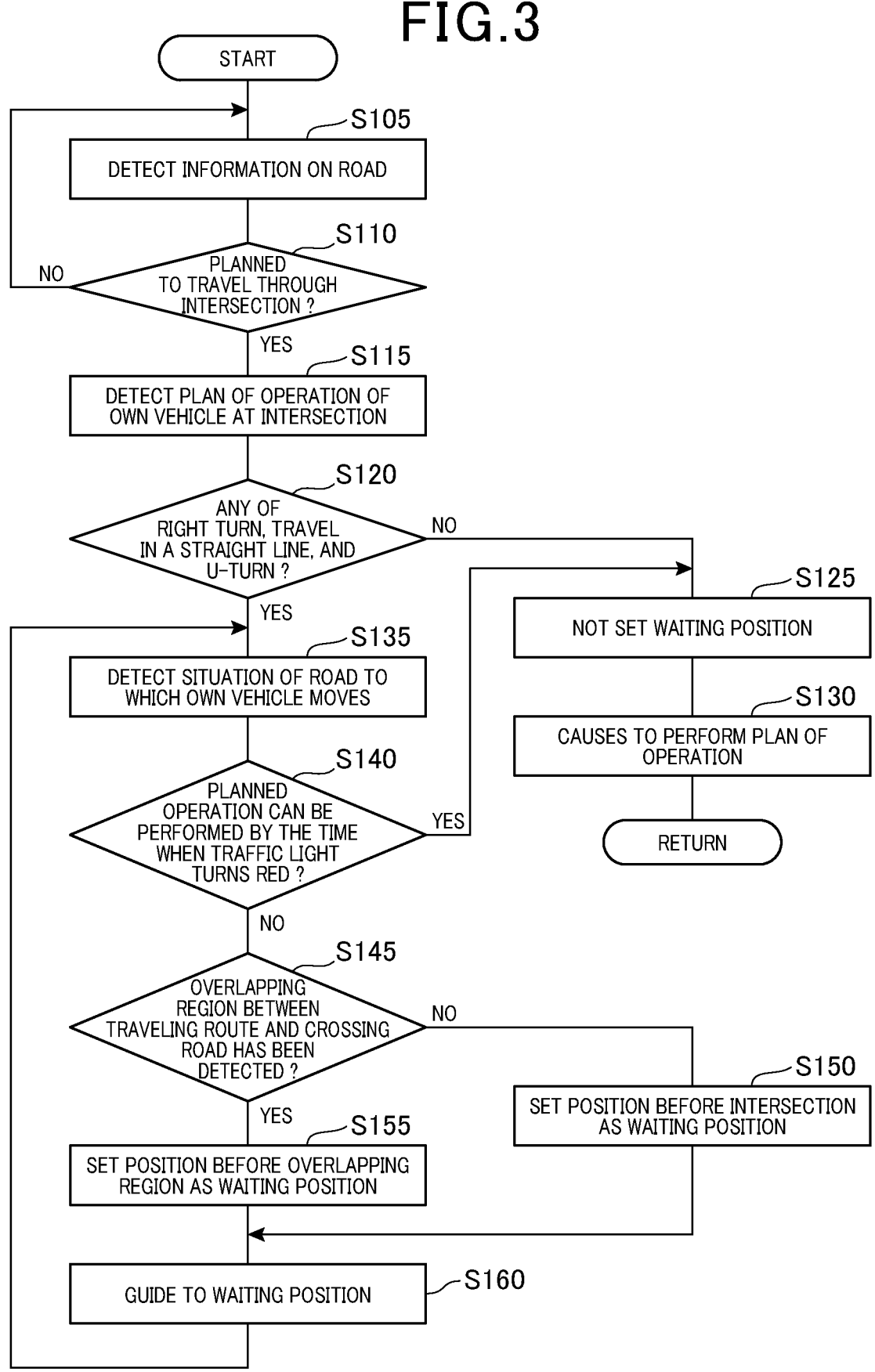
FIG. 3 is a flowchart of a procedure of a vehicle control process according to a first embodiment.

The vehicle control process illustrated in FIG. 3 is performed by the vehicle control apparatus 10 from the time when a start switch of the own vehicle M1 is turned on to the time when the start switch is turned off.

The road information detection section 20 detects information on the road on which the own vehicle M1 travels (step S105). The road information detection section 20 determines whether the own vehicle M1 is planned to travel through the intersection Cr1 (step S110). If it is determined that the own vehicle M1 is not planned to travel through the intersection Cr1 (step S111: NO), the process returns to step S105. Alternatively, if it is determined that the own vehicle M1 is planned to travel through the intersection Cr1 (step S111: YES), the operation detection section 30 detects a plan of operation including movement of the own vehicle M1 at the intersection Cr1 (step S115).

The waiting position setting section 50 determines whether the detected plan of operation corresponds to any one of right turn, travel in a straight line, and U-turn (step S120). If it is determined that the detected plan of operation does not correspond to any one of right turn, travel in a straight line, and U-turn (step S120: NO), that is, if the detected plan of operation is a left turn, the waiting position setting section 50 does not set a waiting position (step S125). In this case, the operation control apparatus 200 causes the own vehicle M1 to perform the plan of operation at the intersection Cr1 (step S130). For example, the engine 211 and the steering mechanism 213 are controlled so that the own vehicle M1 follows a leading vehicle, whereby the own vehicle M1 is caused to turn left. When a leading vehicle temporarily stops according to the situation of a pedestrian crossing or the like, the brake mechanism 212 and the steering mechanism 213 are controlled so that the own vehicle M1 follows the leading vehicle, whereby the own vehicle M1 temporarily stops. When no leading vehicles are present, the engine 211, the brake mechanism 212, and the steering mechanism 213 may be controlled so that the own vehicle M1 travels or temporarily stops. After the completion of step S130, the process returns to step S105.

In step S120, if it is determined that the detected plan of operation corresponds to any one of right turn, travel in a straight line, and U-turn (step S120: YES), the situation detection section 23 detects a road situation of a place to which the own vehicle M1 moves (step S130). Hereinafter, a case where the own vehicle M1 is planned to turn right at the intersection Cr1 will be described.

In step S135, when the own vehicle M1 is planned to turn right at the intersection Cr1, the situation detection section 23 detects a traffic jam situation of a road which the own vehicle M1 reaches after turning right, or the like. The determination section 40 determines whether the own vehicle M1 can perform the planned operation by the time when the traffic light Sg1 on the traveling route Pa1 of the own vehicle M1 at the intersection Cr turns red, by using a detected road situation of a place to which the own vehicle M1 moves (step S140). For example, if a road which the own vehicle M1 reaches after turning right is in a traffic jam and there is no spaces where the own vehicle M1 can travel at a place which the own vehicle M1 reaches after turning right, it is determined the planned operation cannot be performed by the time when the signal turns to right. If there is a space where the own vehicle M1 can travel, it is determined that the planned operation can be performed by the time when the signal turns to right. The space where the own vehicle M1 can travel after turning right corresponds to a place to which the own vehicle M1 moves and a space where the own vehicle M1 can enter.

If it is determined that the own vehicle M1 can perform the planned operation by the time when the traffic light Sg1 turns red (step S140: YES), the process proceeds to step S125. In this case, the operation control apparatus 200 causes the own vehicle M1 to turn right without setting a waiting position (step S130). For example, if an oncoming vehicle traveling in a straight line through the intersection Cr1 is present, the own vehicle M1 is caused to turn right after the oncoming vehicle has passed through the intersection Cr1. For example, if a pedestrian or the like is crossing a pedestrian crossing which the own vehicle M1 reaches after turning right, the own vehicle M1 is caused to turn right after the pedestrian or the like has crossed the pedestrian crossing. In these cases, until the oncoming vehicle completes passing through the intersection Cr1 or the pedestrian or the like completes crossing the pedestrian crossing, the own vehicle M1 is caused to advance at very low speed or temporarily stop. In this case, the stop position differs from the waiting position. After step A130 is completed, the process returns to step 105.

If it is determined that the own vehicle M1 cannot perform the planned operation by the time when the traffic light Sg1 turns red (step S140: NO), the road information detection section 20 determines whether an overlapping region between the traveling route Pa1 and the crossing road Pa2 has been detected (step S145).

Figure 4:
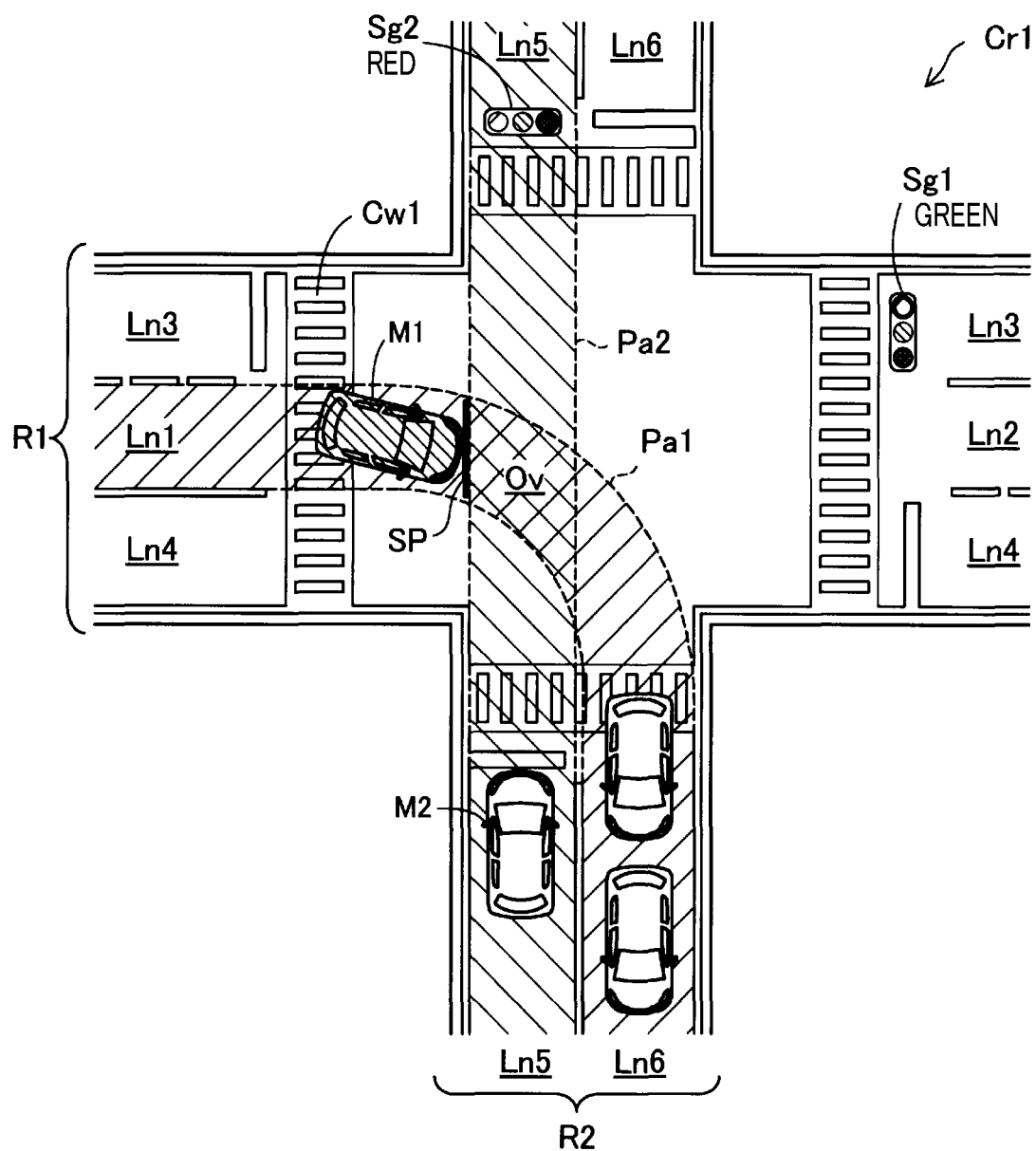
FIG. 4 is an explanatory diagram for describing an overlapping region and waiting positions.

In FIG. 4, an overlapping region Ov between the traveling route Pa1 and the crossing road Pa2 is crosshatched as an area on the road surface, and a waiting position SP set in step S155 described later is indicated by a thick solid line. In FIG. 4, the traffic light Sg1 on the traveling route Pa1 of the own vehicle M1 is green, and the traffic light Sg1 on the crossing road Pa2 is red. In the state shown in FIG. 4, the road (lane Ln6) which the own vehicle reaches after turning right is in a traffic jam.

In step S145 shown in FIG. 3, the traveling route detection section 21 detects the traveling route Pa1, and the cross road detection section 22 detects the crossing road Pa2. Based on the detected traveling route Pa1 and crossing road Pa2, it is determined whether the overlapping region Ov has detected.

If it is determined that the overlapping region Ov between the traveling route Pa1 and the crossing road Pa2 has not been detected (step S145: NO), the waiting position setting section 50 sets a position before the intersection Cr1 as a waiting position SP (step S150). The case in which the overlapping region Ov is not detected is, for example, a case in which information cannot be acquired from the navigation system 80 due to an unstable communication state. The position before the intersection Cr1 may be, for example, a position before a pedestrian crossing CW1 before the intersection Cr1 on the traveling route Pa1. In this case, for example, a white line before the pedestrian crossing CW1 may be recognized based on a detection result of the image sensor 71 to set the white line as the waiting position SP. After step S150 is completed, the process proceeds to step 160 described later.

In contrast, if it is determined that the overlapping region Ov between the traveling route Pa1 and the crossing road Pa2 has been detected (step S145: YES), the waiting position setting section 50 sets a position before the overlapping region Ov and on the traveling route Pa1 as the waiting position SP (step S155). The waiting position SP is calculated based on the overlapping region Ov. The waiting position SP is set to a position before the intersection Cr1.

As shown in FIG. 4, in the present embodiment, the waiting position SP is set so as to contact an imaginary line indicating an edge of the own vehicle M1 in the width direction of the crossing road Pa1. The waiting position SP may be set, for example, at a distance from the overlapping region Ov on the traveling route Pa1. In the present embodiment, the waiting position SP is set as a line indicating a position of an end portion of the own vehicle M1 in the traveling direction. The waiting position SP may be set as a division indicating an area occupied by the body of the own vehicle M1 on the road surface.

The operation control apparatus 200 guides the own vehicle M1 to the set waiting position SP (step S160). More specifically, in order to cause the own vehicle M1 to wait at the set waiting position SP, the operation control apparatus 200 calculates target front and rear positions and target right and left positions of the own vehicle M1 and controls the engine 211, the brake mechanism 212, and the steering mechanism 213 so that the location of the own vehicle M1 on the road surface agree with the target front and rear positions and the target right and left positions. Hence, the own vehicle M1 waits (stops) at the waiting position SP until the own vehicle M1 becomes possible to perform the planned operation.

When the own vehicle M1 is manually driven, in step S175, the notification mechanism 214 may notify the driver of the own vehicle M1 of information on the waiting position SP to guide the own vehicle M1 to the set waiting position SP. For example, the own vehicle M1 may be guided by displaying an image representing the intersection Cr1 and the waiting position SP on a display device configuring the notification mechanism 214. The own vehicle M1 may be guided by a voice instruction from the loudspeaker so as to travel to the waiting position SP and wait at the waiting position SP.

After step S160 is completed, the process returns to step S135. The own vehicle M1 waits (stops) at the waiting position SP, to which the own vehicle M1 has been guided in step S160, by the time when it is determined that the own vehicle M1 can perform the planned operation by the time when the traffic light Sg1 turns red (step S140: YES), based on a road situation of a place to which the own vehicle M1 moves.

Figure 5:
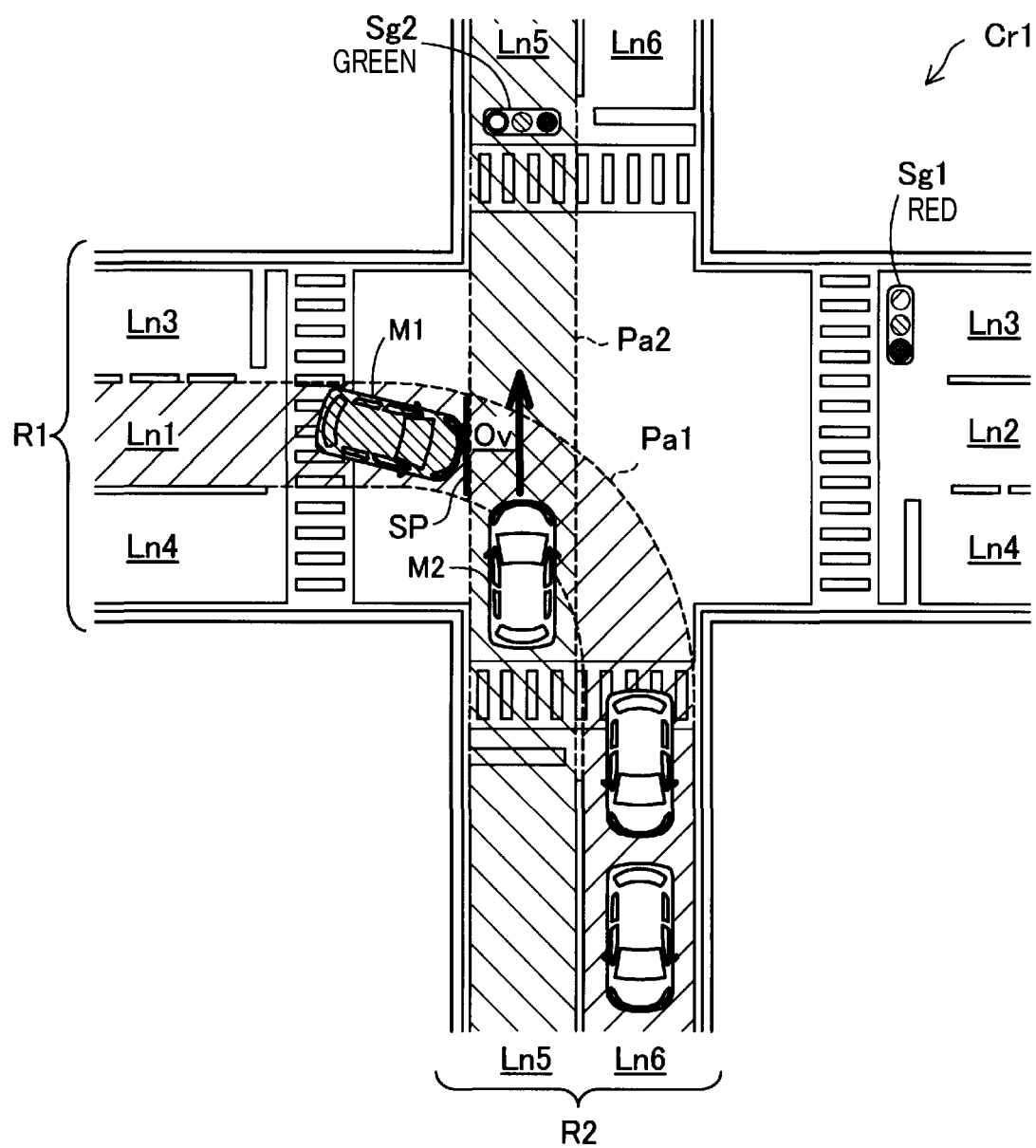
FIG. 5 is an explanatory diagram illustrating a state where a traffic light in a traveling route of an own vehicle has turned red.

FIG. 5 shows a state in which after the traffic light Sg1 on the traveling route Pa1 of the own vehicle M1 has changed to red, the traffic light Sg1 on the crossing road Pa2 intersecting the traveling route Pa1 changes to green. The other vehicle M2 traveling in a straight line on the crossing road Pa2 passes through the intersection Cr1. In this case, the own vehicle M1 is stopped at the waiting position SP set before the overlapping region Ov between the traveling route Pa1 and the crossing road Pa2. Hence, the other vehicle M2 is not hindered from traveling by the stopped own vehicle M1 and can pass through the intersection Cr1.

According to the vehicle control apparatus 10 of the first embodiment described above, if it is determined that the own vehicle M1 cannot perform the planned operation by the time when the traffic light Sg1 on the traveling route of the own vehicle M1 at the intersection Cr turns red, the position before the overlapping region Ov between the traveling route Pa1 and the crossing road Pa2 is set as the waiting position SP. Hence, even if, due to a traffic jam or the like in a road to which the own vehicle moves, the own vehicle M1 remains stopped at the waiting position SP while the own vehicle M1 cannot perform the planned operation by the time when the traffic light Sg1 turns red, the other vehicle M2 is not hindered from traveling on the crossing road Pa2 by the own vehicle M1 stopped at the waiting position SP. Thus, the other vehicle M2 can be prevented from having to stop or detour to avoid the own vehicle M1. In addition, the other vehicle M2 and a vehicle following the other vehicle M2 are not hindered from smoothly traveling, whereby a traffic jam can be prevented from occurring on the crossing road Pa2.

Since the determination section 40 determines whether the own vehicle M1 can perform the planned operation by the time when a traffic light turns red based on a road situation of a place to which the own vehicle M1 moves detected by the situation detection 23, whether the waiting position SP is to be set can be determined according to a situation of the road to which the own vehicle M1 moves such as a traffic jam. Hence, since the waiting position SP is not set when there is no traffic jams or the like on the road to which the own vehicle M1 moves and the own vehicle M1 can perform the planned operation by the time when the traffic light turns red, detection and arithmetic processing of the overlapping region Ov between the traveling route Pa1 and the crossing road Pa2 can be omitted, whereby increase in a processing load of the vehicle control apparatus 10 can be suppressed.

The road information detection section 20 including the traveling route detection section 21, the cross road detection section 22, and the situation detection section 23 detects information on the intersection Cr1 based on a detection result of the monitoring sensor 70 and information from the navigation system 80. Hence, compared with a configuration for detecting the traveling route Pa1, the crossing road Pa2, and the like based on a detection result of one sensor or the like, detection accuracy can be prevented from decreasing. Thus, setting accuracy of the waiting position SP can be prevented from decreasing.

It is determined whether the overlapping region Ov between the traveling route Pa1 and the crossing road Pa2 has been detected. If the overlapping region Ov has not been detected, a position before the intersection Cr1 is set as the waiting position SP. Hence, the overlapping region Ov between the traveling route Pa1 and the crossing road Pa2 is prevented from being erroneously set as the waiting position SP. Thus, the other vehicle M2 is not hindered from traveling through the crossing road Pa2 by the own vehicle M1 due to setting of the overlapping region Ov as the waiting position SP.

since the waiting position SP is not set when the own vehicle M1 is planned to turn left at the intersection Cr1, detection and arithmetic processing of the overlapping region Ov between the traveling route Pa1 and the crossing road Pa2 can be omitted, whereby increase in a processing load of the vehicle control apparatus 10 can be suppressed. When the own vehicle M1 is planned to turn left at the intersection Cr1, even if, due to a traffic jam or the like on the road which the own vehicle M1 reaches after turning left, the own vehicle M1 stops at the overlapping region Ov after the traffic light Sg1 on the traveling route Pa1 of the own vehicle M1 changes to red, the own vehicle M1 can restart traveling after the traffic jam or the like is ended. Hence, the other vehicle M2 is not hindered from traveling through the crossing road Pa2 by the own vehicle M1.

A-3. Comparative Example

Figure 6:
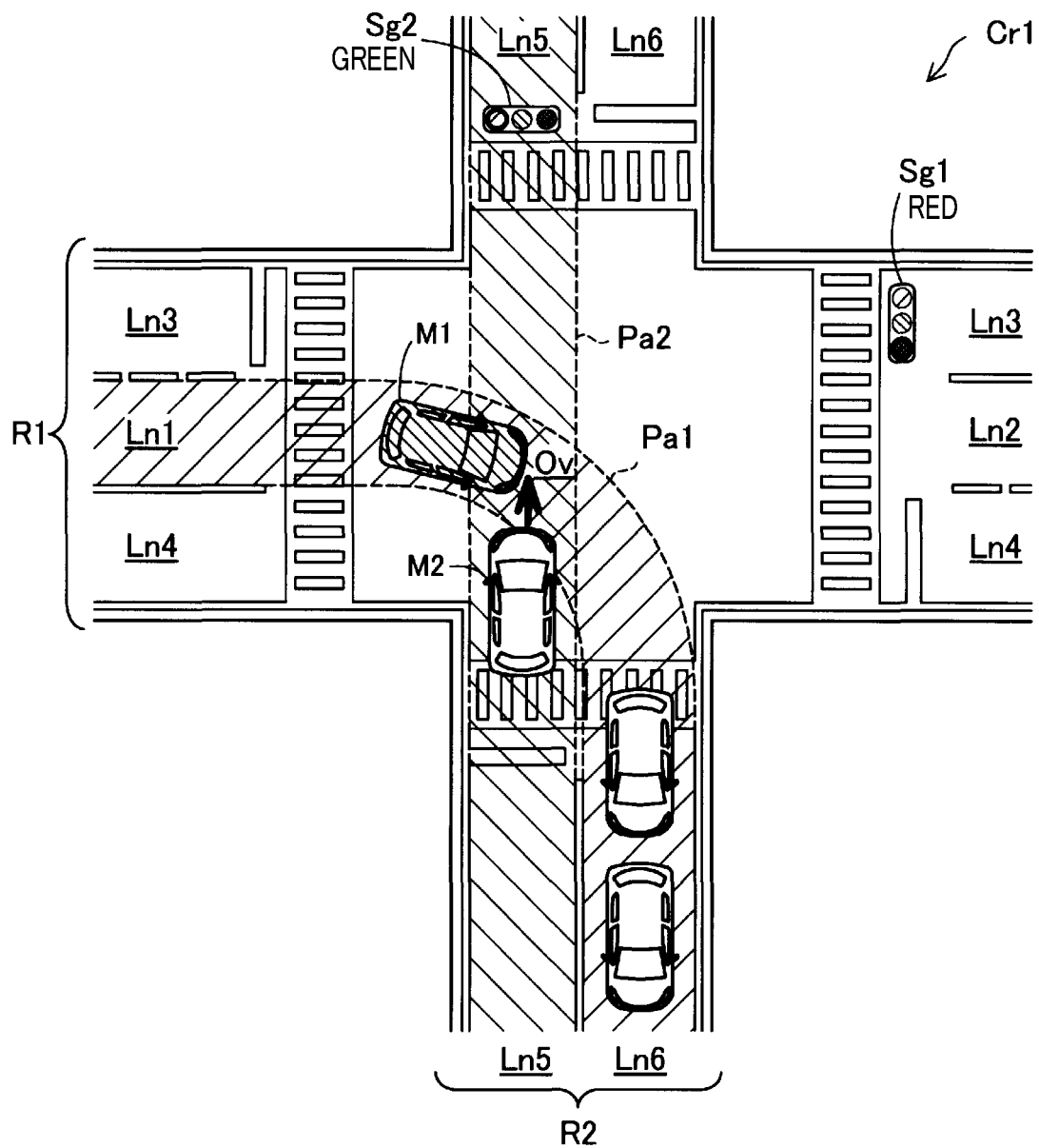
FIG. 6 is an explanatory diagram illustrating a state where a traffic light in a traveling route of an own vehicle has turned red according to a comparative example.

In the comparative example shown in FIG. 6, a waiting position is not set regardless of whether the own vehicle M1 can perform the planned operation by the time when the traffic light Sg1 on the traveling route Pa1 at the intersection Cr1 turns red. FIG. 6 shows a state in which after the traffic light Sg1 on the traveling route Pa1 of the own vehicle M1 changed to red, the traffic light Sg1 on the crossing road Pa2 intersecting the traveling route Pa1 changes to green. In the state shown in FIG. 6, the own vehicle M1 cannot perform the planned operation by the time when the traffic light Sg1 on the traveling route Pa1 turns red, and remains stopped at the overlapping region Ov between the traveling route Pa1 and the crossing road Pa2. Hence, the other vehicle M2 is hindered from traveling in a straight line through the crossing road Pa2 by the own vehicle M1 stopped in the intersection Cr1.

In contrast, according to the vehicle control apparatus 10 of the present embodiment, if it is determined that the own vehicle M1 cannot perform a planned operation by the time when the traffic light Sg1 on the traveling route Pa1 at the intersection Cr1 turns red, the position before the overlapping region Ov between the traveling route Pa1 and the crossing road Pa2 is set as the waiting position SP. Hence, even if, due to a traffic jam or the like in a road to which the own vehicle M1 moves, the own vehicle M1 remains stopped at the waiting position SP while the own vehicle M1 cannot perform the planned operation by the time when the traffic light Sg1 turns red, the other vehicle M2 is not hindered from traveling on the crossing road Pa2 by the own vehicle M1 stopped at the waiting position SP.

B. Second Embodiment

Figure 7:
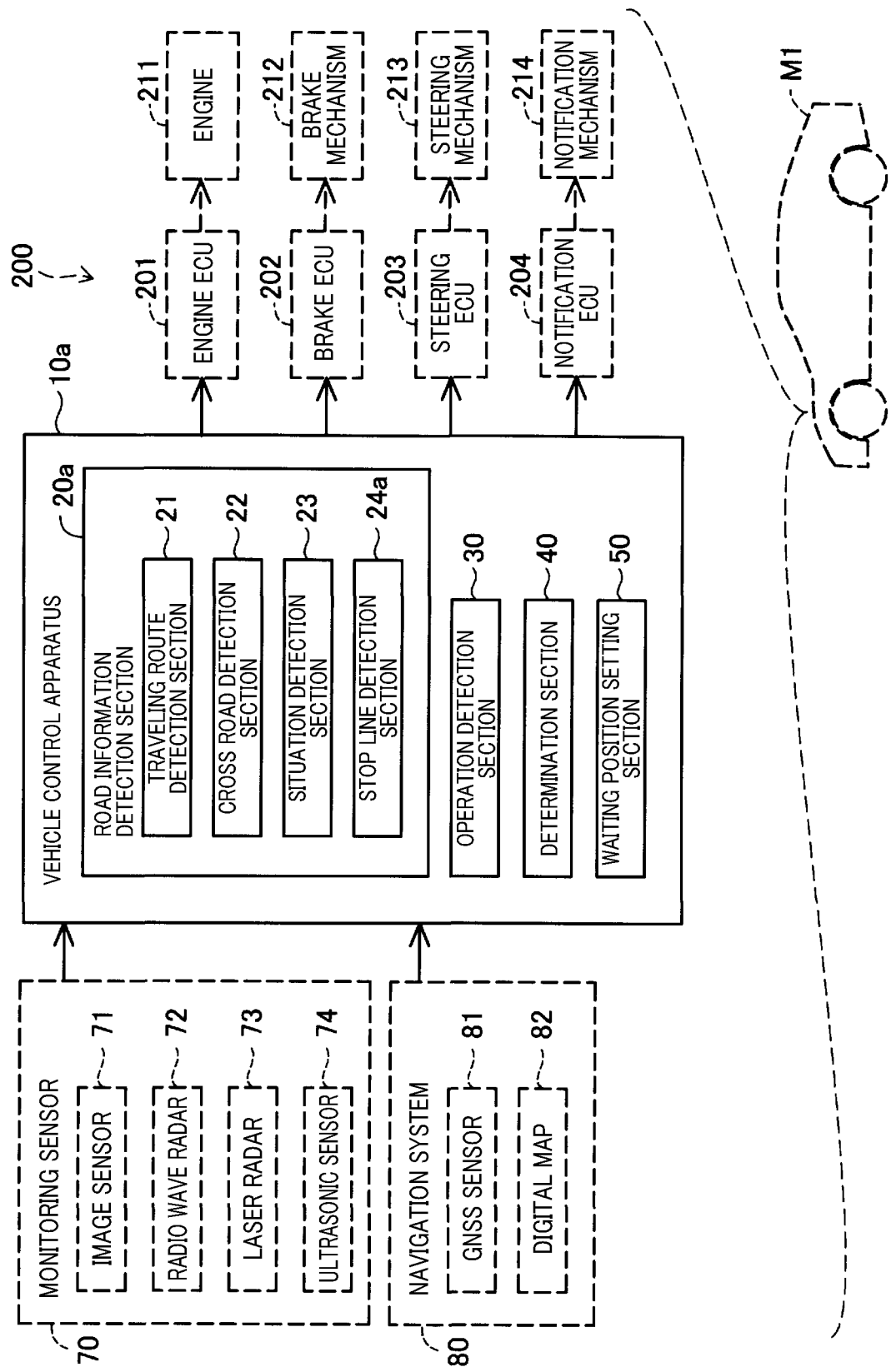
FIG. 7 is a block diagram illustrating a schematic configuration of a vehicle control apparatus according to a second embodiment.

A vehicle control apparatus 10a of the second embodiment shown in FIG. 7 differs from the vehicle control apparatus 10 of the first embodiment in that the vehicle control apparatus 10a includes a road information detection section 20a instead of the road information detection section 20 and in a procedure of the vehicle control process. Since other components are the same as those of the vehicle control apparatus 10 of the first embodiment, the same components are denoted by the same reference signs to omit redundant description.

The road information detection section 20a of the vehicle control apparatus 10 of the second embodiment further includes a stop line detection section 24a. The stop line detection section 24a detects a stop line on the traveling route Pa1 at an intersection Cr2. The stop line is detected based on a detection result of the image sensor 71 and information from the navigation system 80. The stop line may be detected based on at least one of the detection result of the image sensor 71 and the information from the digital map 82.

Figure 8:
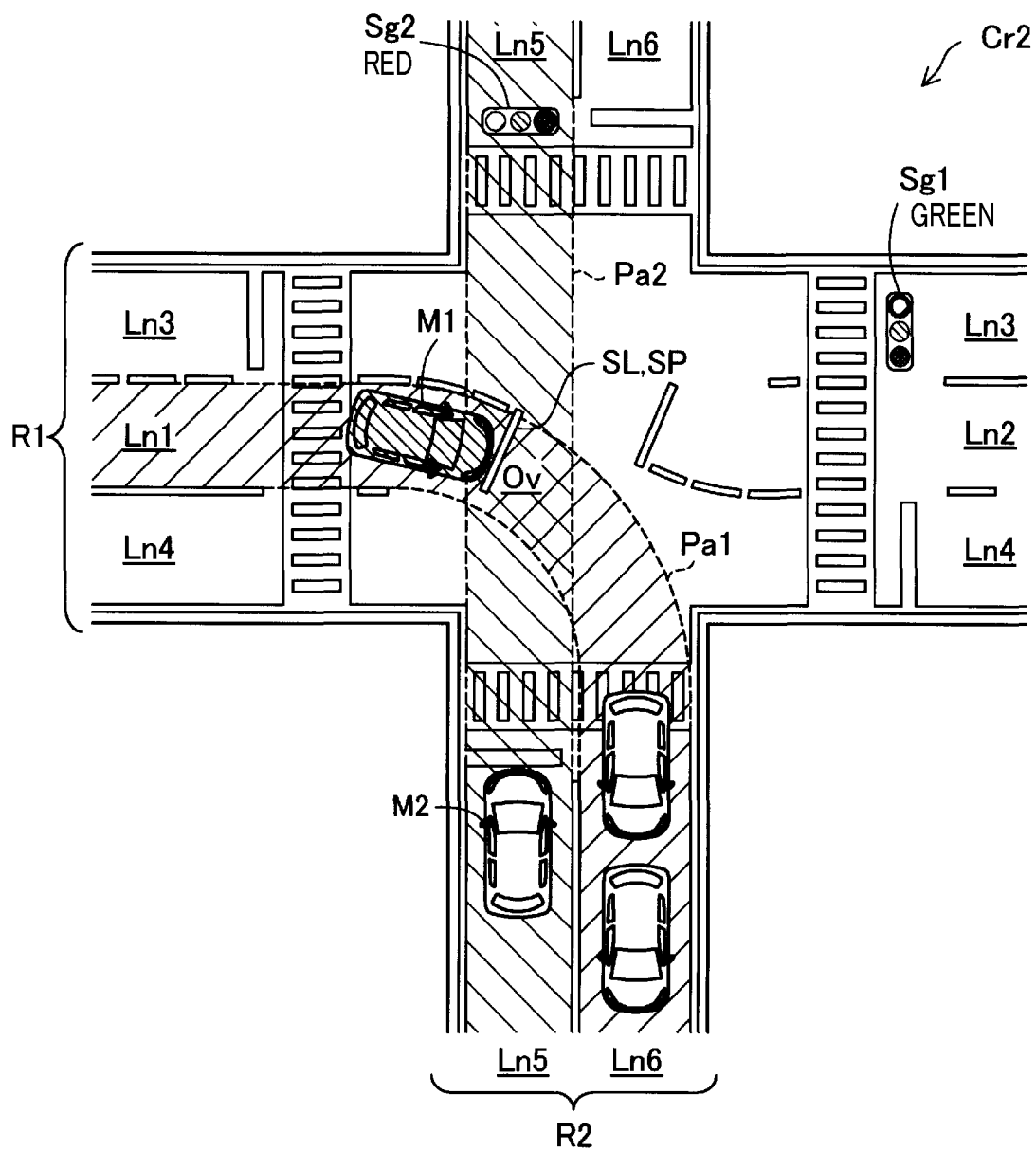
FIG. 8 is an explanatory diagram for describing a stop line.

The example shown in FIG. 8 illustrates a case in which the own vehicle M1 turns right at the intersection Cr2, and a stop line SL is present on the traveling route Pa1 on which the own vehicle M1 turns right. The stop line SL is located at the overlapping region Ov between the traveling route Pa1 and the crossing road Pa1. That is, the stop line SL is located in the intersection Cr2.

Figure 9:
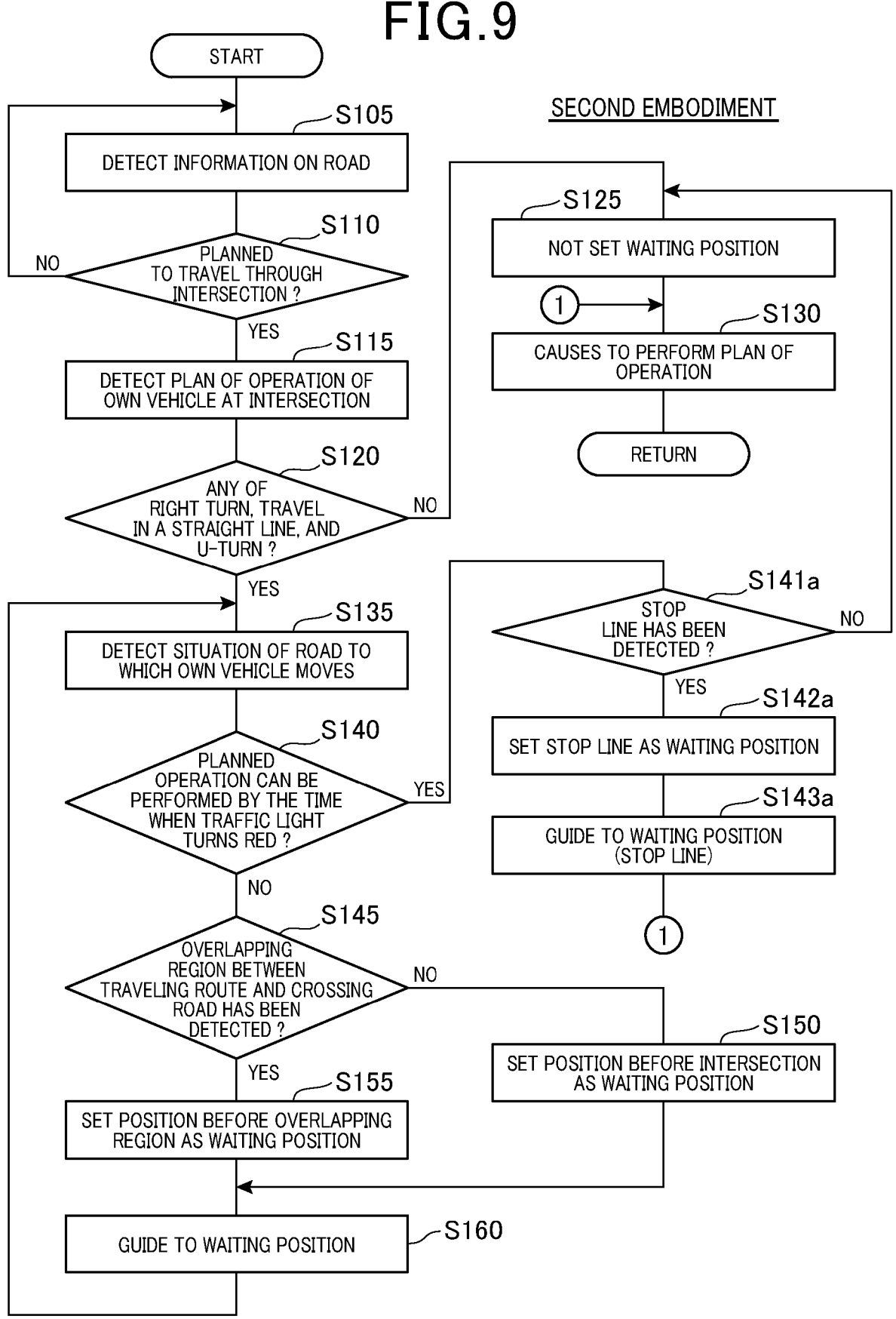
FIG. 9 is a flowchart of a procedure of a vehicle control process according to the second embodiment.

As shown in FIG. 9, the vehicle control process of the second embodiment differs from the vehicle control process of the first embodiment in that if YES determination is made in step S140, steps S141a, S142a, and S143a are performed instead of step S125.

If it is determined that the own vehicle M1 can perform the planned operation by the time when the traffic light Sg1 turns red (step S140: YES), the waiting position setting section 50 determines whether the stop line detection section 24a has detected the stop line SL of the traveling route Pa1 at the intersection Cr2 (step S141a). If it is determined that the stop line SL has not been detected (step S141a: NO), the process proceeds to step S125. In contrast, if it is determined that the stop line SL has been detected (step S141a: YES), the waiting position setting section 50 sets the detected stop line SL as the waiting position SP (step S142a). In other words, if it is determined that the stop line SL is present in the intersection Cr2 and there is a space to which the own vehicle M1 moves and where the own vehicle M1 can enter, the stop line SL in the intersection Cr2 is set as the waiting position SP. Hence, the waiting position SP set by the waiting position setting section 50 corresponds to a position in the intersection Cr2 set in step S142a and positions before the intersection Cr2 set in steps S150 and S155. The operation control apparatus 200 guides the own vehicle M1 to the set waiting position SP (stop line SL) (step S143a). After the completion of step S143a, the process proceeds to step S130.

According to the vehicle control apparatus 10a of the second embodiment described above, effects similar to those of the vehicle control apparatus 10 of the first embodiment are provided. The vehicle control apparatus 10a of the second embodiment sets the detected stop line SL as the waiting position SP, if it is determined that the own vehicle M1 can perform the planned operation by the time when the traffic light Sg1 turns red. Hence, even when the stop line SL located on the overlapping region Ov between the traveling route Pa1 and the crossing road Pa2 is set as the waiting position SP, the own vehicle M1 can perform the planned operation by the time when the traffic light Sg1 turns to red. Thus, the other vehicle M2 is not hindered from traveling on the crossing road Pa2 by the own vehicle M1. In addition, since the stop line SL is set as the waiting position SP, a position where the own vehicle M1 is expected to wait by manual driving can be set as the waiting position SP, whereby driving close to manual driving can be achieved even when automatic driving is performed. The own vehicle M1 can be prevented from waiting at excessive backward position from the intersection Cr2, whereby the own vehicle M1 and a vehicle following the own vehicle M1 are not hindered from smoothly traveling

C. Other Embodiments (1) In the above embodiments, the case has been described in which the own vehicle M1 travels through the intersections Cr1 and Cr2 at which two roads R1 and R2 are orthogonal to each other. However, the present disclosure is not limited to this. For example, the present disclosure may be applied to a case in which the own vehicle M1 travels through an intersection at which two roads intersect without being orthogonal to each other, or a case in which the own vehicle M1 travels through an intersection at which three or more roads intersect. For example, the present disclosure may be applied a case where the own vehicle M1 travels through an intersection in which roads are curved.

Figure 10:
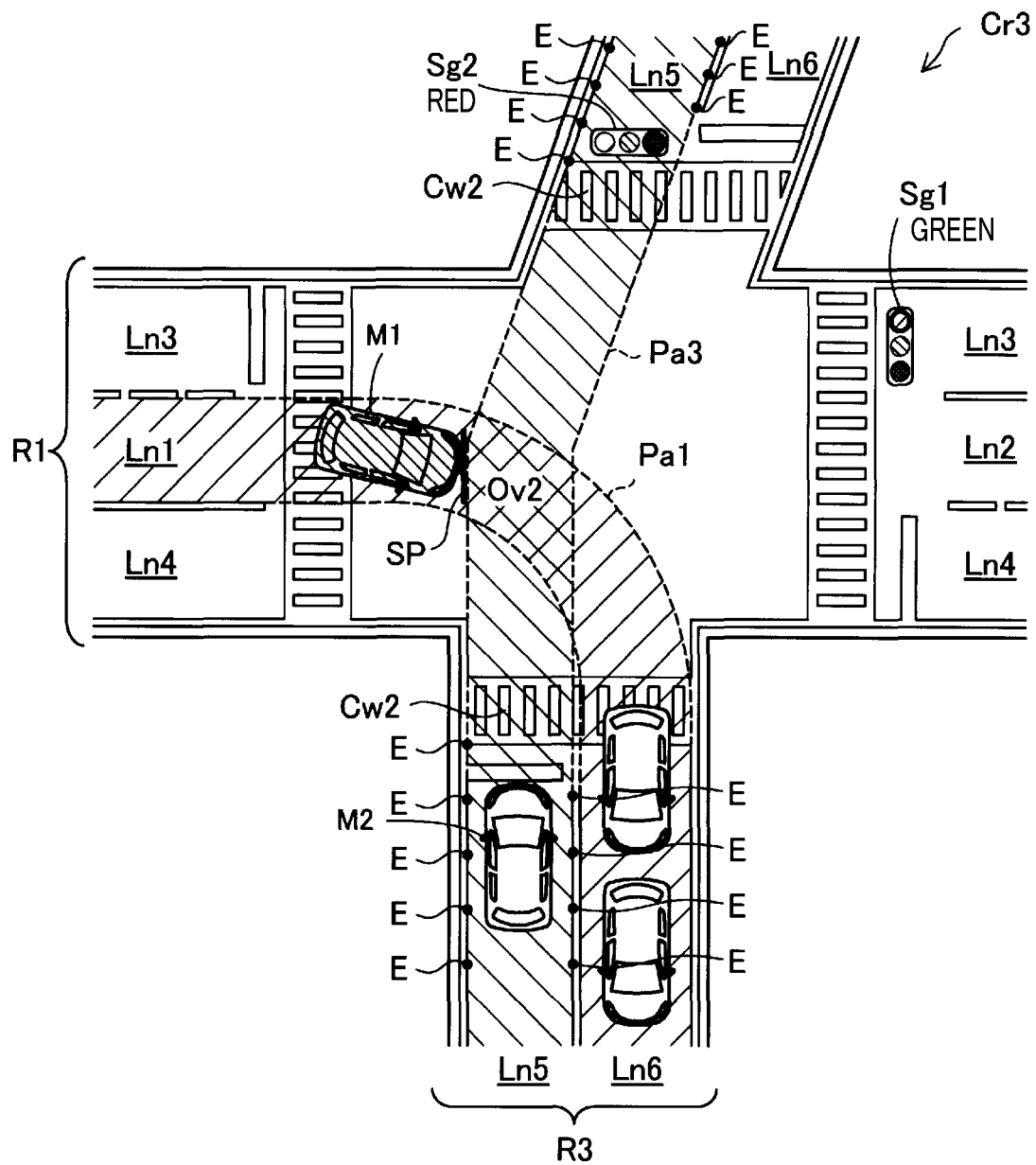
FIG. 10 is an explanatory diagram for describing an example of a shape of an intersection according to another first embodiment.

In the example shown in FIG. 10, a road R3 intersecting the road R1 on which the own vehicle M1 is traveling curves in an intersection Cr3. The other vehicle M2 traveling on such a crossing road Pa3 turns along the road in the intersection Cr3. The crossing road Pa3 and an overlapping region Ov2 in such a crossing road Pa3 may be detected as below. A group of points (hereinafter, also referred to as edges E) that is further from the intersection Cr3 than a pedestrian crossing Cw2 present in a crossing road Pa3 is detected on the digital map 82 to detect the crossing road Pa3 by creating an imaginary line connecting the edges E. In addition, the overlapping region Ov2 is determined from the detected crossing road Pa3 and traveling route Pa1. The waiting position SP may be set at a position before the overlapping region Ov2 on the traveling route Pa1. The above configuration also provides effects similar to those of the above embodiments.

(2) In the above embodiment, the overlapping region Ov between the traveling route Pa1 and the crossing road Pa2 and the overlapping region Ov2 between the traveling route Pa1 and the crossing road Pa3 are detected as an areas on the road surface. However, the present disclosure is not limited to this.

Figure 11:
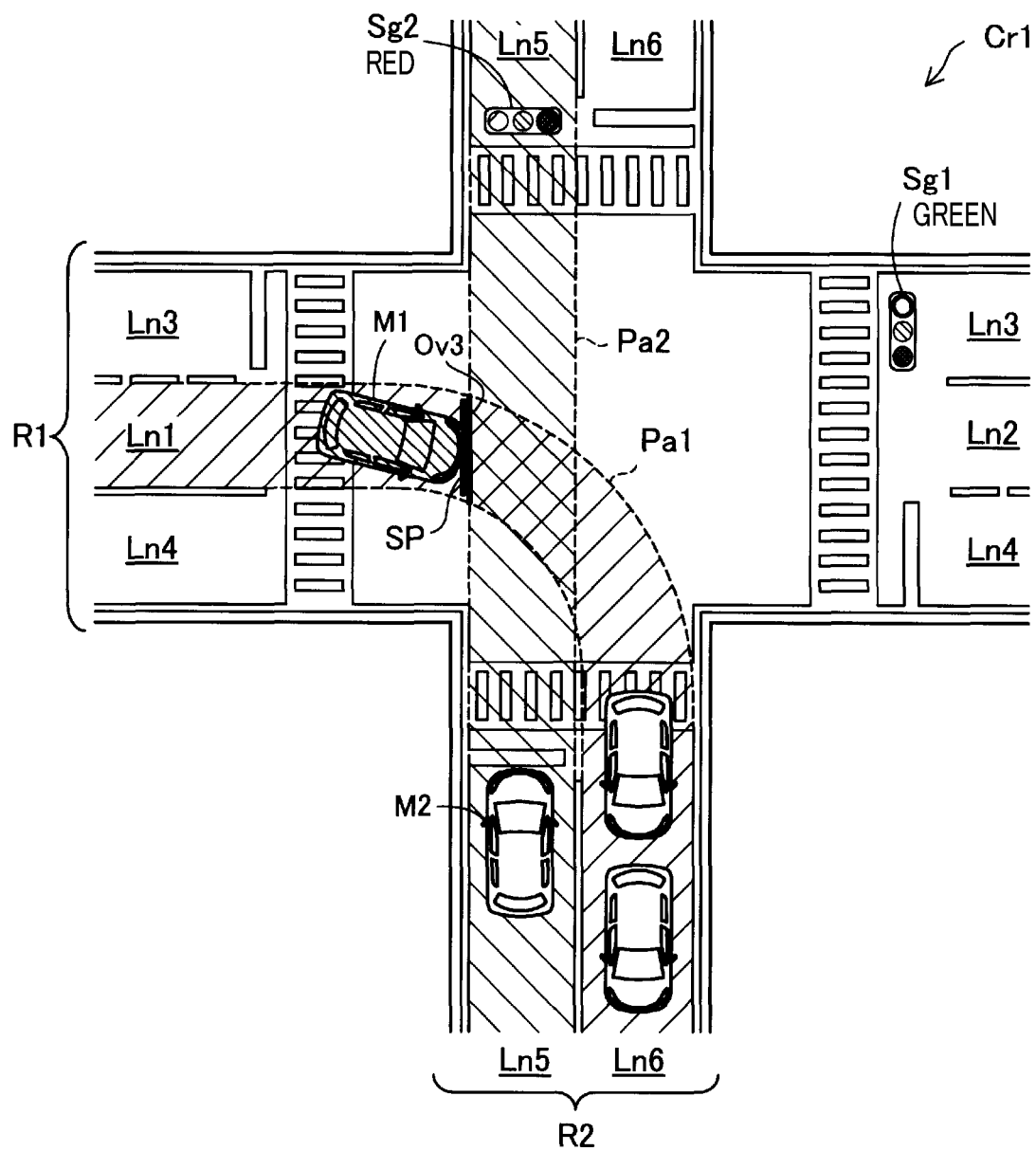
FIG. 11 is an explanatory diagram for describing an overlapping region according to another second embodiment.

As shown in FIG. 11, for example, a position where an imaginary line indicating an edge of the own vehicle M1 in the width direction of the crossing road Pa2 intersecting traveling route Pa1 may be detected as an overlapping region Ov3. A position before the overlapping region Ov3 on the traveling route Pa1 detected as a line on the road surface may be set as the waiting position SP. The above configuration also provides effects similar to those of the above embodiments.

(3) In the above embodiments, the case has been described in which the own vehicle M1 turns right at the intersection Cr1, Cr2, or Cr3. However, not only when the own vehicle M1 crosses the on-coming lane Ln4 but also when the own vehicle M1 travels in a straight line or makes U-turn, YES determination is made in step S120, whereby the process proceeds to step S135. In the above embodiments, the case has been described in which vehicles follow the traffic regulations under which vehicles run on left-side lanes. However, the present disclosure may be applied to the case in which vehicles follow the traffic regulations under which vehicles run on right-side lanes. When vehicles follow the traffic regulations under which vehicles run on left-side lanes, in step S120, it may be determined whether the detected plan of operation corresponds to any one of plans to turn right, travel in a straight line, and U-turn. If the detected plan of operation is turning right, a waiting position may not be set at step s125. That is, typically, when turning right or left by which the own vehicle does not cross on-coming lane Ln4 is detected as a plan of operation, the waiting position setting section 50 may not set the waiting position SP. The above configurations also provide effects similar to those of the above embodiments.

(4) In the vehicle control process of the above embodiments, in step S140, it is determined whether the own vehicle M1 can perform the planned operation by the time when the traffic light Sg1 turns red. However, step S140 may be omitted. In such an embodiment, the waiting position setting section 50 may set the waiting position SP regardless of whether the own vehicle M1 can perform the planned operation by the time when the traffic light Sg1 turns red. That is, typically, the waiting position SP at which the own vehicle M1 waits at the intersection Cr1, Cr2, or Cr3 by the time when the own vehicle M1 can perform operation including movement in the intersection Cr1, Cr2, or Cr3 may be set to a position at which the other vehicle M2 is not hindered from traveling through the crossing road Pa1 or Pa3 by the own vehicle M1 stopped at the waiting position SP. Such a configuration also provides effects similar to those of the above embodiments.

(5) In the vehicle control process of the second embodiments, if it is determined that the own vehicle M1 can perform the planned operation by the time when the traffic light Sg1 turns red (step S140: YES), it is determined whether the stop line SL has been detected (step S141a). However, step S140 and step S141a may be performed in reverse order. In such an embodiment, if it is determined that the stop line SL has not been detected (step S141a: NO), the process proceeds to step S145. Then, in step S150 or step S155, a position before the intersection Cr2 may be set as the waiting position SP. Such a configuration also provides effects similar to those of the second embodiment.

(6) The methods of detecting the traveling route Pa1, the crossing roads Pa2 and Pa3, and the like in the above embodiments are examples and can be variously modified. For example, referring to the digital map 82 may be omitted, and the traveling route Pa1, the crossing roads Pa2 and Pa3, and the like may be detected from a detection result of the monitoring sensor 70 of the own vehicle M1. In such an embodiment, for example, the crossing roads Pa2 and Pa3 may be estimated and detected based on the number of lanes of the crossing roads Pa2 and Pa3 recognized from information on white lines or the like acquired by the image sensor 71 and a shape of the intersection Cr1, Cr2, or Cr3 recognized from information on objects or the like acquired from the laser radar 73. Such a configuration also provides effects similar to those of the above embodiments.

(7) The configurations of the vehicle control apparatuses 10, 10a of the above embodiments are examples and can be variously modified. For example, the vehicle control apparatuses 10, 10a may have the operation control apparatus 200. According to this configuration, setting of the waiting position SP and guidance to the waiting position SP can be achieved by one apparatus. The navigation system 80 of the own vehicle M1 may have additional devices such as a communication device. The communication device may be configured so as to, for example, be able to perform radio communication with an intelligent transport system, inter-vehicle communication with other vehicles, and road-to-vehicle communication with roadside radio devices provided to road facilities. According to such a configuration, information acquired through radio communication can be used to detect traveling route Pa1, the crossing roads Pa1 and Pa3, and the like.

(8) The vehicle control apparatuses 10, 10a of the above embodiments are installed and used in the own vehicle M1 that includes an engine as a power source and can perform automatic driving. However, the present disclosure is not limited to this. For example, the vehicle control apparatuses 10, 10a may be provided in a vehicle that can perform manual driving only. For example, the vehicle control apparatuses 10, 10a may be installed in a fuel-cell vehicle, a hybrid vehicle, an electric vehicle, or the like.

(9) In the above embodiments, part of the configuration implement by hardware may be replaced with software. Alternatively, part of the configuration implement by software may be replaced with hardware. For example, at least one function section of the road information detection section 20, the operation detection section 30, the determination section 40, and the waiting position setting section 50 may be implemented by an integrated circuit, a discrete circuit, or a module of the combination thereof. When part or all of the functions of the present disclosure is implemented by software, the software (computer program) can be provided in the form stored in a computer-readable storage medium. The computer-readable storage medium is not limited to a portable storage medium such as a flexible disk and a CD-ROM but includes an internal storage device of the computer such as a RAM, a ROM, and the like and an external storage device fixed to the computer such as a hard disk. That is, the computer-readable storage medium has a broad meaning including any storage medium capable of storing data packets non-transitorily and fixedly.

The present disclosure is not limited to the above-described embodiments and can be implemented with various configurations within a scope not deviating from the gist of the present disclosure. For example, technical featured in the above-described embodiment can be replaced or combined as appropriate to solve part or all of the above-described problems to be solved or to achieve part or all of the above-described effects. Further, the technical features, which are not described as essential features in the present specification, can be deleted as appropriate.

According to the embodiment of the present disclosure, a vehicle control apparatus is provided.

The vehicle control apparatus vehicle control apparatus (10, 10a) is installed in an own vehicle (M1) and controls the own vehicle. The apparatus includes:

an intersection information detection section (20, 20a) that detects information on an intersection (Cr1, Cr2, Cr3) through which the own vehicle travels, and includes a traveling route detection section (21) that detects a traveling route (Pa1) of the own vehicle and a cross road detection section (22) that detects a cross road (pa1, Pa3) intersecting the traveling route;

an operation detection section (30) that detects a plan of operation including movement of the own vehicle at the intersection;

a waiting position setting section (50) that sets a waiting position (SP) where the own vehicle is caused to wait at the intersection until the own vehicle becomes possible to perform the operation; and a determination section (40) that determines whether the own vehicle is able to perform the operation by the time when a traffic light (Sg1) on the traveling route at the intersection turns red, wherein the intersection information detection section includes a stop line detection section (24a) that detects a stop line (SL) that is on the traveling route and is located at an overlapping region between the traveling route and the crossing road, the waiting position setting section sets a position, where another vehicle (M2) is not hindered from traveling on the crossing road by the own vehicle stopped at the waiting position, as the waiting position, the waiting position setting section sets a position in the traveling route and before an overlapped position (Ov, Ov2, Ov3) between the detected traveling route and crossing road as the waiting position, if the determination section determines that the own vehicle is not able to perform the operation, the waiting position setting section sets the waiting position, and if the determination section determines that the own vehicle is able to perform the operation, the waiting position setting section sets the detected stop line as the waiting position.

According to the vehicle control apparatus of the embodiment, the waiting position setting section sets a waiting position where the own vehicle is caused to wait at the intersection until the own vehicle becomes possible to perform the operation, and sets a position, where another vehicle is not hindered from traveling on the crossing road by the own vehicle stopped at the waiting position, as the waiting position. Hence, the vehicle is prevented from being hindered from traveling in crossing roads.

The present disclosure can be implemented in various forms. For example, the present disclosure can be implemented as, for example, a vehicle including the vehicle control apparatus, a vehicle control method, and a computer program for implementing the apparatus or the method.

What is claimed is:

1. A vehicle control apparatus that is installed in an own vehicle and controls the own vehicle, the apparatus comprising:

an intersection information detection section that detects information on an intersection through which the own vehicle travels, and includes a traveling route detection section that detects a traveling route of the own vehicle and a cross road detection section that detects a cross road intersecting the traveling route;

an operation detection section that detects a plan of operation including movement of the own vehicle at the intersection;

a waiting position setting section that sets a waiting position where the own vehicle is caused to wait at the intersection until the own vehicle becomes possible to perform the operation;

a determination section that determines whether the own vehicle is able to perform the operation by the time when a traffic light on the traveling route at the intersection turns red, wherein the intersection information detection section includes a stop line detection section that detects a stop line that is on the traveling route and is located at an overlapping region between the traveling route and the crossing road, the waiting position setting section sets a position, where another vehicle is not hindered from traveling on the crossing road by the own vehicle stopped at the waiting position, as the waiting position, the waiting position setting section sets a position in the traveling route and before an overlapped position between the detected traveling route and crossing road as the waiting position, when the determination section determines that the own vehicle is not able to perform the operation, the waiting position setting section sets the waiting position, and when the determination section determines that the own vehicle is able to perform the operation, the waiting position setting section sets the detected stop line as the waiting position, and the vehicle control apparatus further comprising a guidance section that controls the own vehicle based on the set waiting position.

2. The vehicle control apparatus according to claim 1, wherein when turning right or left by which the own vehicle does not cross an on-coming lane is detected as a plan of the operation, the waiting position setting section does not set the waiting position.

3. The vehicle control apparatus according to claim 1, wherein the guidance section guides the own vehicle to the set waiting position.

4. A vehicle control apparatus that is installed in an own vehicle and controls the own vehicle, the apparatus comprising:

an intersection information detection section that detects a traveling route of the own vehicle and a road situation of the traveling route after an intersection of the traveling route and a crossing road intersecting the traveling route;

an operation detection section that detects planned operation of the own vehicle at the intersection;

a determination section that, when a traffic light at the intersection on a traveling route is green, determines whether the own vehicle is able to perform the planned operation by the time when the traffic light turns red; and a waiting position setting section that sets a waiting position where the own vehicle is caused to wait before the intersection or in the intersection until the own vehicle becomes possible to perform the planned operation, wherein when the determination section determines that the traffic light is green and the own vehicle is not able to perform the planned operation by the time when the traffic light turns red, the waiting position setting section sets a position before the intersection as the waiting position, and, when the determination section determines that the traffic light is green and the own vehicle is able to perform the planned operation by the time when the traffic light turns red, the waiting position setting section sets a position in the intersection as the waiting position, and the vehicle control apparatus further comprising a guidance section that controls the own vehicle based on the set waiting position.

5. A vehicle control apparatus that is installed in an own vehicle and controls the own vehicle, the apparatus comprising:

an intersection information detection section that detects information on an intersection through which the own vehicle travels, and includes a traveling route detection section that detects a traveling route of the own vehicle and a cross road detection section that detects a cross road intersecting the traveling route; and a waiting position setting section that sets a waiting position where the own vehicle is caused to wait before the intersection or in the intersection, wherein when it is determined that a stop line is present in the intersection, and a space where the own vehicle is able to enter is present in a place which the own vehicle moves, the waiting position setting section sets the stop line in the intersection as the waiting position, and when it is determined that a stop line is not present in the intersection, or a space where the own vehicle is able to enter is not present in a place which the own vehicle moves, the waiting position setting section sets a position before the intersection as the waiting position, and the vehicle control apparatus further comprising a guidance section that controls the own vehicle based on the set waiting position.

* * * * *